UNITED STATES PATENT OFFICE.

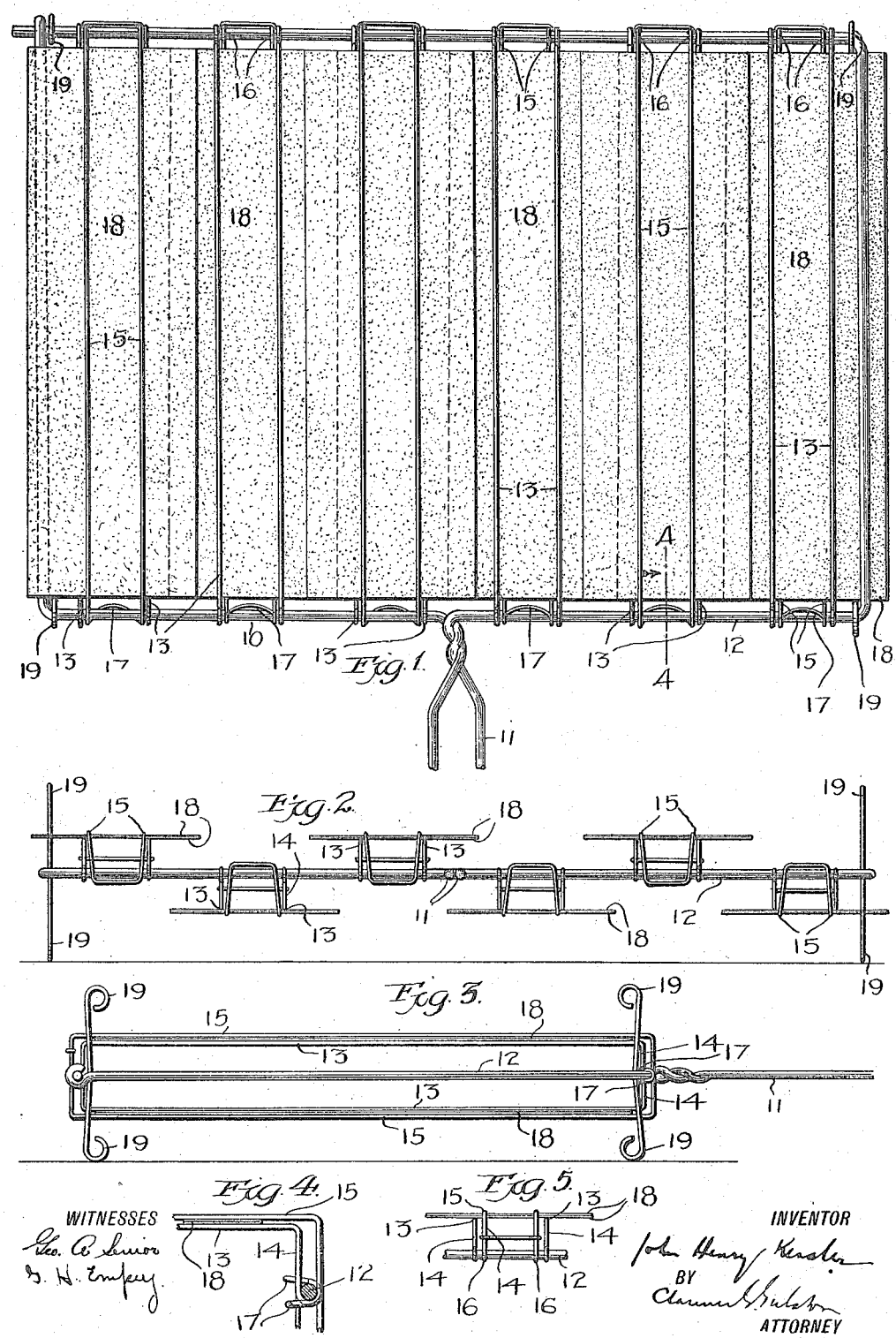

JOHN HENRY KESSLER, OF NYACK, NEW YORK.

MEANS FOR CATCHING INSECTS, MORE ESPECIALLY FLIES AND MOSQUITOES.

1,133,382.  Specification of Letters Patent.  Patented Mar. 30, 1915.

Application filed May 7, 1914. Serial No. 836,900.

*To all whom it may concern:*

Be it known that I, JOHN HENRY KESSLER, a citizen of the United States, and a resident of Nyack, county of Rockland, State of New York, have invented a certain new and useful Improvement in Means for Catching Insects, More Especially Flies and Mosquitoes, of which the following is a specification.

The invention is an improvement in means for catching insects, more especially flies and mosquitos, and the object has been to provide an implement whereby these pests can be caught on the wing with great ease and certainty. This is accomplished by the provision on an open frame of sheets or strips having sticky surfaces arranged in spaced planes and in staggered relation, so that surfaces in one group come opposite spaces in another, with the result that when the device is swung at an insect in the air a draft or suction is created which tends to draw the insect through the openings at the advancing side and against the sticky surfaces in rear. Thus, if the insect is not caught on the outside surfaces he will become entangled on one of the inside ones.

The accompanying drawings illustrate a preferred, practical form of the invention, but it will be understood that the novel principles of construction and operation are susceptible of embodiment in numerous other specifically different constructions.

In the said views: Figure 1 is a plan view of the device, the handle being broken away; Fig. 2 is an elevation looking at the handle end of Fig. 1, the handle being sectioned; Fig. 3 is a side elevation of the device; Fig. 4 is a section on the line 4—4 of Fig. 1; and Fig. 5 is a detail elevation taken at the opposite end of the device.

The particular illustrative embodiment shown in the foregoing views will now be briefly described.

The structural part of the device comprises an open, generally flat wire frame 10, having a suitable handle 11 projecting in the general plane of the frame. As illustrated, the frame or frame-work comprises a simple rectangular main frame 12, made by bending a sufficiently stout piece of wire to form the four sides thereof, and a portion of it at one side being looped and bent to form the said handle.

Supporting bars 13 cross the frame at opposite sides, being offset from the plane of the main frame 12 by their end portions 14, which are fixed to opposite side members of this main frame and project away therefrom. There are thus provided two sets of parallel supporting bars, which, as shown, are arranged in pairs. Coöperating with each of these pairs is a skeleton clamp 15, also made of wire, the same being hinged at one end to the main frame, as indicated at 16, and at the other end being provided with retaining means, in the nature of a hooked tip 17 to take over the opposite member of the frame.

The supports and clamps thus formed are disposed in staggered relation at opposite sides of the frame, and are adapted to receive strips of sticky fly-paper 18, which are placed on the supporting bars and held thereagainst by the clamps. These strips being cut to appropriate width afford surfaces alternating with openings, which surfaces and openings at one side are opposite openings and surfaces on the other side, and vice-versa. As shown, the strips of each series are preferably wider than the openings between them, so that the strips of one series are in overlapping relation to the strips of the other, see Fig. 2. The strips may have sticky composition on one side only of each, or on both sides, or two strips placed plain sides together and sticky sides out may be clamped in each holder.

If both sides of each strip, or double strips, are sticky, the device may be used without regard to which side of the device is the advancing side, and if the insect escapes the outer, front surfaces, it will find itself drawn through the openings therebetween into the interior space, where it will be swept by the air currents against one of the inner surfaces. If desired for safety, in order to avoid the danger of articles coming in contact with the sticky composition, such composition may be disposed on the inner surfaces only. Still another possibility is to have the composition only on the inner surfaces of one of the sets of strips, the other set merely serving to coöperate therewith to create the air currents through the device whereby the insect is entrapped; or, again, the material might be only on the outer surfaces of the strips at the advancing side and the inner surfaces of the strips at the rear side. It will be understood also that I am not limited to the use of sticky fly-paper, and that strips or sheets of various kinds might be employed, also that the means for supporting the same may be varied. Further, it will be apparent that while it is preferable to have just two series of strips or expanded members spaced apart at a short distance, at opposite sides of the frame, more than two sets in various staggered arrangements may be employed.

In order to enable the implement to be put down without danger, the frame is provided with legs 19, preferably fixed to the corners of the main frame 12. These legs project above or beyond the supports for the sticky leaves and thus prevent the surfaces of these coming in contact with a table or the like on which the device may be placed.

While the device is preferably embodied as a hand implement, it will be understood that it is possible to utilize the same principles in a mechanically supported and operated apparatus.

What I claim as new is:

1. An insect catcher comprising an open frame having a handle and bearing means in spaced planes affording two series of extended sticky surfaces alternating with openings whereby when the device is set in motion a draft is created which draws insects through the openings and against the sticky surfaces.

2. A device for catching insects comprising an open movable frame, means thereon affording a series of extended sticky surfaces alternating with openings, and means spaced in front of said sticky surfaces and affording a series of expanded surfaces alternating with openings through which insects may pass to become entangled in the surfaces behind.

3. An insect catcher, comprising an open movable frame and two series of expanded members thereon provided with sticky surfaces, said series being spaced from each other at a short distance and the members of each series being separated by openings, which openings are opposite the members of the other series.

4. An insect catcher, comprising an open movable frame carrying two series of parallel strips provided with sticky surfaces, the said series being spaced at a short distance and the strips of each series being separated from each other by openings affording entrances to the interior space, the strips of one series being opposite the openings of the other.

5. An insect catcher, comprising an open movable frame, a group of members thereon having expanded sticky surfaces alternating with openings, and another similar group spaced from the first and in staggered relation thereto, said members having sticky surfaces facing in the same direction in the two groups, whereby insects not caught on the outer surfaces of the first group pass through the openings therebetween and become entangled on the surfaces of the second group.

6. An insect catcher, comprising an open movable frame, and expanded members thereon lying in substantially parallel spaced planes and in staggered relation and provided with sticky surfaces.

7. An insect catcher, comprising an open movable frame, and strips carried by the frame, the same being arranged in substantially parallel planes and in staggered relation and being provided with sticky surfaces.

8. In a device for catching insects, the combination of a flat open frame provided with a handle, and strips having sticky surfaces mounted on opposite sides of said frame, the strips on each side being separated from each other and being opposite the spaces between the strips on the other side.

9. In a device for catching insects, the combination of an open wire frame having sets of supporting bars in spaced planes, strips of sticky-surfaced material disposed in staggered relation to each other on said bars, and hinged clamps overlying said strips and holding the same against said bars.

10. In a device for catching insects, the combination of a simple wire frame having a handle, wire supports crossing said frame and offset from the plane thereof, and clamps adapted to extend lengthwise of said supports and hold strips of sticky fly-paper thereagainst, said clamps being hinged at one end and provided with retaining means at the opposite end.

11. In a device for catching insects, the combination of an open frame having a handle and provided with sets of supporting bars disposed in spaced planes, and skeleton clamps adapted to extend lengthwise of said bars to hold strips of sticky fly-paper thereagainst.

12. In a device for catching insects, the combination of an open frame having a handle and provided with sets of supporting bars in spaced planes for receiving pieces of sticky paper, clamps for holding the same against said bars, and feet on said frame projecting beyond the planes of said supports.

13. In a device of the character described, the combination of an open frame having supports crossing the same, the said supports being arranged in spaced sets and in staggered relation, and means for holding strips of sticky fly-paper to said supports.

14. A device for catching insects, comprising an open movable frame, and series of parallel strips mounted on the frame and provided with sticky surfaces, the strips of each series being separated by openings and the members of one series being opposite the openings of another series and wider than said openings.

15. In a device for catching insects, comprising an open movable frame carrying holders in staggered relation adapted to receive strips of sticky-surfaced material, in combination with the said strips mounted in said holders in staggered overlapping relation and having sticky surfaces on both sides.

JOHN HENRY KESSLER.

Witnesses:
G. H. EMPEY,
S. J. GIBSON.

Copies of this patent may be obtained for five cents each, by addressing the "Commissioner of Patents, Washington, D. C."